(12) United States Patent
Beck et al.

(10) Patent No.: US 6,737,122 B2
(45) Date of Patent: May 18, 2004

(54) METHOD FOR COATING SUBSTRATES

(75) Inventors: Erich Beck, Ladenburg (DE); Friedrich-Wilhelm Raulfs, Mannheim (DE); Karl Siemensmeyer, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/332,988

(22) PCT Filed: Jul. 23, 2001

(86) PCT No.: PCT/EP01/08492

§ 371 (c)(1),
(2), (4) Date: Jan. 24, 2003

(87) PCT Pub. No.: WO02/08346

PCT Pub. Date: Jan. 31, 2002

(65) Prior Publication Data

US 2003/0152715 A1 Aug. 14, 2003

(30) Foreign Application Priority Data

Jul. 24, 2000 (DE) .......................................... 100 35 961

(51) Int. Cl.[7] .................................................. C08F 2/46
(52) U.S. Cl. .................... 427/492; 427/256; 427/385.5; 427/508; 427/510; 427/511; 427/512; 427/521; 427/553; 427/557; 427/559; 427/595
(58) Field of Search ................................. 427/492, 256, 427/385.5, 508, 510, 511, 512, 521, 553, 557, 559, 595

(56) References Cited

U.S. PATENT DOCUMENTS

| 4,194,955 | A | 3/1980 | Nowak et al. |
| 5,200,490 | A | 4/1993 | Jaeger et al. |
| 6,294,592 | B1 | 9/2001 | Herrmann et al. |

FOREIGN PATENT DOCUMENTS

| DE | 25 51 347 | 2/1977 |
| EP | 0 658 607 | 6/1995 |
| GB | 2 138 834 | 10/1984 |
| JP | 62 064874 | 3/1987 |
| JP | 05 039335 | 2/1993 |
| JP | 08048922 | 8/1994 |
| JP | 8-239614 | 9/1996 |

*Primary Examiner*—Bernard Pianalto
(74) *Attorney, Agent, or Firm*—Oblon, Spivak, McClelland, Maier & Neustadt, P.C.

(57) ABSTRACT

The present invention relates to a method of coating substrates, including the following steps:

a. applying a flowable coating composition to the target substrate and b. curing the resulting wet coating by exposure to high energy radiation, wherein said coating composition comprises as binder a polymer A containing less than 1 mol/(kg of polymer A) of reactive groups, selected from ethylenically unsaturated double bonds and epoxy groups, and at least 2 mol/(kg of polymer A) of functional groups of the formula

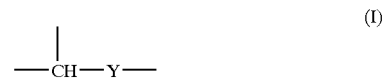

(I)

where Y is N—H or oxygen.

13 Claims, No Drawings

METHOD FOR COATING SUBSTRATES

The present invention relates to a method of coating substrates which comprises
 a. applying a flowable coating composition to the target substrate and then
 b. curing the resulting wet coating by exposure to high energy radiation.

The production of coatings by applying a flowable coating composition to the target substrate (i.e., the substrate that is to be coated) and then curing the resulting wet coating by exposure to high energy radiation is known from the prior art: for example, from P.K.T. Oldring et al. in Chemistry and Technology of UV and EB Formulation for Coatings, Inks and Paints, SITA Technology, London (1991).

The coating compositions used in such techniques generally comprise organic polymers or prepolymers containing two or more ethylenically unsaturated double bonds or epoxy groups per molecule. On exposure to high energy radiation, e.g., UV radiation, of the substrate provided with the coating composition, these reactive groups undergo photopolymerization, in the course of which a polymeric network is formed in the as yet uncured coating. In this way, a solid coating is obtained. Radiation-curable coatings is a term used in this context. Accordingly, the polymers or oligomers that are present in these coating compositions, containing reactive groups, are also referred to as radiation-curable binders. In order to achieve sufficient strength in the coating, such polymers are required to include a certain amount of reactive groups, generally not less than 2 mol/kg of polymer (or oligomer).

Radiation-curable coatings are frequently used to coat wood or paper, for woodblock flooring or in the furniture industry, for example. There have also been reports on the use of radiation-curable coating compositions in the form of UV-curable inks, as for example in EP-A 658 607, JP-A 48922/96 and WO 99/01517. The inks described therein comprise as binders for the pigments a radiation-curable binder system based on ethylenically unsaturated polymers which on exposure to UV radiation undergo photopolymerization and so fix the pigments on the printed surface.

One of the advantages of radiation-curable coatings is their high mechanical stability. In addition, radiation-curable coating compositions can be processed very much more rapidly than their conventional counterparts, since the coating cures by a rapid photopolymerization rather than by a slow drying process or thermal crosslinking reactions. However, it is in the reactive nature of these coating compositions that they must be stored and processed in the absence of light and are also of only limited stability with respect to oxygen. Moreover, the adhesion of such coating compositions to smooth, nonswellable surfaces is often inadequate.

Conventional inks comprising polyvinylbutyral as their binder are known from DE-A 33 15 741. Japanese Laid-Open Specification H8-239614, moreover, proposes polyacetals as cobinders in thermally curable inks. Such inks exhibit poor adhesion to printed substrates, especially to plastics or surface coatings.

It is an object of the present invention, in view of the fundamental advantages of radiation curing for the production of coatings, to provide a further method of producing coatings using high energy radiation. It is also intended in particular that the method should be suitable for printing substrates and should overcome the disadvantages of the prior art.

We have found that this object is achieved by means of a method wherein the binder used comprises a polymer containing less than 1 mol/kg of reactive groups, selected from ethylenically unsaturated double bonds and epoxy groups, and at the same time at least 2 mol/kg of functional groups of the formula I defined below.

Accordingly, the present invention provides a method of coating, especially printing, substrates and with particular preference of producing thin films having dry film thicknesses of on average not more than 10 μm, including the following steps:
 a. applying a flowable coating composition to the target substrate and
 b. curing the resulting wet coating by exposure to high energy radiation,
wherein said coating composition comprises as binder a polymer A containing less than 1 mol/(kg of polymer A) of reactive groups and at least 2 mol/(kg of polymer A), preferably 3 mol/kg, in particular 4 mol/kg, with particular preference 5 mol/kg, of functional groups of the formula I

where Y is N—H or oxygen, embodied by the substructures of the formula IA, IB or IC

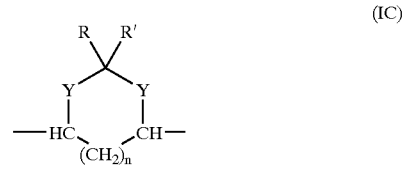

where
 R and R' independently of one another are hydrogen or $C_1$–$C_4$-alkyl
 R" is $C_1$–$C_{10}$-alkyl,
 Y is as defined above, and
 n is 0 or 1,
the structural units of the formula IA, IB or IC being constituents of the polymer chain.

The term "coating" as used here embraces printing, enscription, or coating in any other way. Substructures and functional groups for the purposes of the invention are defined groups of atoms in the polymer A.

The structural elements of the formulae IA, IB and IC comprise ether groups, amino groups, acetals, ketals, aminals and hemiaminals and also the alcohol or amine moieties in esters or amines that carry a hydrogen atom in each case on at least one carbon atom adjacent to the heteroatom.

Among the functional groups of the formulae I, preference is given to those structural elements in which Y is oxygen. R in formula IA is preferably hydrogen. In formula IC, at least one of the two radicals R and R' is hydrogen. Preferred polymers A are those containing structural units of the formula IC, and in turn those in which Y is oxygen.

Polymers A generally have a weight-average molecular weight of 1000, preferably at least 2000, in particular at least 5000, e.g., from 5000 to 5,000,000.

Examples of polymers A containing substructures of the formula IA where Y is oxygen are polyoxymethylene (POM), poly-$C_2$–$C_4$-alkylene oxides, such as polyethylene oxide, polypropylene oxide, polybutylene oxide, polyisobutylene oxide, and also polytetrahydrofuran, polyesters of aliphatic diols, polyether esters, polyether amides, polyether urethanes, and the like.

Examples of polyesters of aliphatic diols are the polyesters of aliphatic and/or aromatic dicarboxylic acids, such as phthalic acid, terephthalic acid and isophthalic acid, adipic acid, maleic acid, fumaric acid or sebacic acid, with $C_2$–$C_{10}$-alkanediols, such as ethylene glycol, 1,4-butanediol and 1,6-hexanediol, and also hydrogenated products. Examples of polyether esters are the polyesters of the aforementioned dicarboxylic acids with polyether diols, such as polyethylene oxide. Accordingly, the polyether amides are polyamides of the aforementioned dicarboxylic acids with polyethers containing terminal amino groups.

Examples of polymers A with substructures IA are, in addition, polyurethanes of aliphatic and/or aromatic diisocyanates with aliphatic diols and also polyurethanes of the aforementioned diisocyanates with polyether diols (polyether urethanes).

Examples of polymers A with structural units IB where Y is oxygen are the homopolymers and copolymers of $C_1$–$C_{20}$-vinyl ethers, such as methyl vinyl ether, ethyl vinyl ether, isobutyl vinyl ether, and octadecyl vinyl ether. Examples of suitable comonomers for the vinyl ethers are maleic anhydride, vinyl acetate, vinyl chloride, styrene, and carbon dioxide.

The polymers with structural units of the formula IC where Y is oxygen comprise acetalized and/or ketalized polyvinyl alcohol whose hydroxyl groups have been acetalized or ketalized in polymer-analogous reaction with aldehydes or ketones respectively. Examples of such polymers are the reaction product of polyvinyl alcohol with formaldehyde (polyvinyl formal), the reaction product of polyvinyl alcohol with butyraldehyde (polyvinyl butyral), and the reaction product of polyvinyl alcohol with acetone (polyvinyl dimethyl ketal). In the polymers A of this type, generally at least 50 mol %, preferably at least 60 mol %, e.g., from 75 to 90 mol %, of the hydroxyl groups are in acetalized or ketalized form. Such polymers generally have a weight-average molecular weight of at least 10,000 daltons and, in particular, in the range from 20,000 to 250,000 daltons.

Examples of polymers A in which Y in the structural units IA, IB and IC is NH are polyalkyleneimines, such as polyethyleneimine, polyamides of the aforementioned dicarboxylic acids with aliphatic diamines, such as ethylenediamine, 1,4-butylenediamine, hexamethylenediamine, and isophoronediamine.

Preferred polymers A are the poly-$C_1$–$C_{10}$-alkyl vinyl ethers, polyoxymethylene, poly-$C_2$–$C_4$-alkylene oxides, polyether esters, polyether amides, polyether urethanes, acetalized polyvinyl alcohols and ketalized polyvinyl alcohols, particular preference being given to the acetalized and the ketalized polyvinyl alcohols. Very particular preference is given to acetalized polyvinyl alcohols, and of these particular preference to polyvinyl butyral. Of course, the binder used may also comprise mixtures of the abovementioned polymers A.

In addition to the polymers A, the flowable coating compositions used in the method of the invention may also comprise ethylenically unsaturated cobinders, i.e., radiation-curable prepolymers or polymers having a double bond content of at least 2 mol/kg of (pre)polymer and/or mono- or polyethylenically unsaturated monomers. The fraction of the ethylenically unsaturated cobinder may be up to 90% by weight, based on the total amount of binder constituents in the coating composition, for example, from 10 to 90% by weight or, in particular, from 20 to 80% by weight. In other embodiments, the coating composition contains no ethylenically unsaturated cobinder.

By ethylenically unsaturated polymers or prepolymers are meant oligomeric or polymeric compounds containing at least 2 mol/kg, e.g., from 2 to 10 mol/kg and, in particular, from 2.5 to 7 mol/kg of (pre)polymer, of ethylenically unsaturated double bonds, preferably in the form of vinyl, allyl, acryloyl or methacryloyl groups. Here and below, ethylenically unsaturated prepolymers are oligomeric compounds which in contrast to the low molecular mass ethylenically unsaturated monomers have a number average molecular weight of at least 300 g/mol. The boundary between polymers and oligomers is not a fixed one. In general, prepolymeric compounds are considered to be those having a molecular weight of up to 2500 g/mol. Compounds having a higher molecular weight, on the other hand, are generally counted as polymers. With preference in accordance with the invention the coating compositions comprise as ethylenically unsaturated cobinders at least one ethylenically unsaturated prepolymer and, if desired, an ethylenically unsaturated monomer.

Further suitable ethylenically unsaturated cobinders are mono- or polyethylenically unsaturated monomers, which in contrast to the prepolymers generally have a number average molecular weight of less than 400 g/mol. In the context of radiation-curable coatings, these monomers are also known as reactive diluents. The reactive diluents may be used as sole ethylenically unsaturated cobinder or may be used together with the abovementioned ethylenically unsaturated prepolymers or polymers, the double bond content of these mixtures generally having the values indicated above. In the mixtures of reactive diluent and ethylenically unsaturated (pre)polymers, the weight ratio of reactive diluent to (pre)polymer is preferably in the range from 50:1 to 1:50, more preferably from 10:1 to 1:10.

Examples of ethylenically unsaturated polymers and prepolymers are polyester (meth)acrylates, urethane (meth) acrylates, epoxy (meth)acrylates, melamine acrylates, and silicone acrylates, it also being possible for the (meth) acrylates to have been modified with tertiary amino groups.

The polyester (meth)acrylates comprise the (meth)acrylic esters of polyesterols which may be saturated or unsaturated. Examples of suitable polyesterols are those preparable by esterifying polycarboxylic acids, preferably dicarboxylic acids, with polyols, preferably diols. The starting materials for such hydroxyl-containing polyesters are known to the skilled worker. Preferred candidates for use as dicarboxylic acids are succinic acid, glutaric acid, adipic acid, sebacic acid, maleic acid, fumaric acid, o-phthalic acid, their isomers and hydrogenation products, and also esterifiable derivatives of said acids, such as anhydrides or dialkyl esters. Suitable polyols include the abovementioned alcohols, preferably ethylene glycol, 1,2-propylene glycol and 1,3-propylene glycol, 1,4-butanediol, 1,6-hexanediol, neopentyl glycol, and cyclohexanedimethanol, and also polyalkylene glycols based on ethylene glycol and propylene glycol. Polyester (meth)acrylates may be prepared in two or more stages or else in one stage, as described in EP-A-279 303, from (meth)acrylic acid, polycarboxylic acid, and polyol.

Epoxy (meth)acrylates are those, for example, as obtainable by the reaction of epoxidized olefins or mono-, di- or polyglycidyl ethers, such as bisphenol A diglycidyl ether, with (meth)acrylic acid, such a reaction being known to the skilled worker. Urethane (meth)acrylates comprise, in particular, reaction products of hydroxyalkyl (meth) acrylates with polyisocyanates and/or diisocyanates.

Examples of suitable reactive diluents are monomers containing vinyl groups, especially N-vinyl compounds such as N-vinylpyrrolidone, N-vinylcaprolactam and N-vinylformamide, and vinyl ethers, such as ethyl, propyl, isopropyl, butyl, isobutyl, tert-butyl, amyl, 2-ethylhexyl, dodecyl, octadecyl and cyclohexyl vinyl ether, ethylene glycol monovinyl and divinyl ether, di-, tri- and tetraethylene glycol monovinyl and divinyl ether, polyethylene glycol divinyl ether, ethylene glycol butyl vinyl ether, triethylene glycol methyl vinyl ether, polyethylene glycol methyl vinyl ether, butanediol monovinyl and divinyl ether, hexanediol monovinyl and divinyl ether, cyclohexanedimethanol monovinyl and divinyl ether, trimethylolpropane trivinyl ether, aminopropyl vinyl ether, diethylamino ethyl vinyl ether, and polytetrahydrofuran divinyl ether, vinyl esters, such as vinyl acetate, propionate, stearate and laurate, and vinylaromatics, such as vinyltoluene, styrene, 2- and 4-butylstyrene and 4-decylstyrene, and also acrylate monomers, such as phenoxyethyl acrylate, tert-butylcyclohexyl acrylate, hexanediol diacrylate, dipropylene glycol diacrylate, tripropylene glycol diacrylate, and trimethylolpropane triacrylate.

Also suitable as cobinders are compounds containing epoxy groups. Examples of such are cyclopentene oxide, cyclohexene oxide, epoxidized polybutadiene, epoxidized soybean oil, 3',4'-epoxycyclohexylmethyl 3,4-epoxycyclohexanecarboxylate and glycidyl ethers, e.g., butanediol diglycidyl ether, hexanediol diglycidyl ether, bisphenol A diglycidyl ether, and pentaerythritol diglycidyl ether.

In the method of the invention it is possible to use coating compositions which are free from photoinitiators. It is also possible, however, to add photoinitiators to the coating compositions. The photoinitiators are preferably used when the coating composition comprises a radiation-curable cobinder.

Where the coating compositions comprise a photoinitiator, it is usually used in an amount of from 0.1 to 10% by weight and preferably in an amount of from 0.5 to 8% by weight, based on the total amount of the binder constituents present in the coating composition.

Preferred photoinitiators are those which trigger free-radical photopolymerization of the ethylenic double bonds of the cobinder, examples being benzophenone and its derivatives such as 4-phenylbenzophenone and 4-chlorobenzophenone, acetophenone derivatives such as 1-benzoylcyclohexan-1-ol, 2-hydroxy-2,2-dimethylacetophenone and 2,2-dimethoxy-2-phenylacetophenone, benzoin and its ethers such as methyl, ethyl and butyl benzoin ether, benzil ketals such as benzil dimethyl ketal, 2-methyl-1-[4-(methylthio)phenyl]-2-morpholinopropan-1-one, and acylphosphine oxides such as 2,4,6-trimethylbenzoyldiphenylphosphine oxide and bisacylphosphine oxides.

Also suitable are photoinitiators which trigger cationic photopolymerization of ethylenically unsaturated double bonds or of epoxy groups in the cobinder.

To color the coating, the coating compositions used in the method of the invention may further comprise one or more organic or inorganic pigments, preferably in finely divided form. Vat dyes are also to be understood as organic pigments in this context.

Examples of suitable pigments are the following.

| Organic pigments: | |
|---|---|
| monoazo pigments: | C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 251, 112, 146, 170, 184, 210 and 245; C.I. Pigment Yellow 1, 3, 73,, 74, 65, 97, 151 and 183; |
| disazo pigments: | C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 128, 155, 174, 176 and 188; |
| anthanthrone pigments: | C.I. Pigment Red 168 (C.I. Vat Orange 3). |
| anthraquinone pigments: | C.I. Pigment Yellow 147 and 177; C.I. Pigment Violet 31; |
| anthrapyrimidine pigments: | C.I. Pigment Yellow 108 (C.I. Vat Yellow 20); |
| quinacridone pigments: | C.I. Pigment Red 122, 202 and 206; C.I. Pigment Violet 19; |
| quinophthalone pigments: | C.I. Pigment Yellow 138; |
| dioxazine pigments: | C.I. Pigment Violet 23 and 37; |
| flavanthrone pigments: | C.I. Pigment Yellow 24 (C.I. Vat Yellow 1); |
| indanthrone pigments: | C.I. Pigment Blue 60 (C.I. Vat Blue 4) and 64 (C.I. Vat Blue 6); |
| isoindoline pigments: | C.I. Pigment Orange 69; C.I. Pigment Red 260; C.I. Pigment Yellow 139 and 185; |
| isoindolinone pigments: | C.I. Pigment Orange 61; C.I. Pigment Red 257 and 260; C.I. Pigment Yellow 109, 110, 173 and 185; |
| isoviolanthrone pigments: | C.I. Pigment Violet 31 (C.I. Vat Violet 1); |
| metal complex pigments: | C.I. Pigment Yellow 117, 150 and 153; C.I. Pigment Green 8; |
| perinone pigments: | C.I. Pigment Orange 43 (C.I. Vat Orange 7); C.I. Pigment Red 194 (C.I. Vat Red 15); |
| perylene pigments: | C.I. Pigment Black 31 and 32; C.I. Pigment Red 123, 149, 178, 179 (C.I. Vat Red 23), 190 (C.I. Vat Red 29) and 224; C.I. Pigment Violet 29; |
| phthalocyanine pigments: | C.I. Pigment Blue 15, 15:1, 15:2, 15:3, 15:4, 15:6 and 16; C.I. Pigment Green 7 and 36; |
| pyranthrone pigments: | C.I. Pigment Orange 51; C.I. Pigment Red 216 (C.I. Vat Orange 4); |
| thioindigo pigments: | C.I. Pigment Red 88 and 181 (C.I. Vat Red 1); C.I. Pigment Violet 38 (C.I. Vat Violet 3); |
| triarylcarbonium pigments: | C.I. Pigment Blue 1, 61 and 62; C.I. Pigment Green 1; C.I. Pigment Red 81, 81:1 and 169; C.I. Pigment Violet 1, 2, 3 and 27; |

C.I. Pigment Black 1 (aniline black);
C.I. Pigment Yellow 101 (aldazine yellow);
C.I. Pigment Brown 22;
vat dyes (other than those already mentioned above)

C.I. Vat Yellow 2, 3, 4, 5, 9, 10, 12, 22, 26, 33, 37, 46, 48, 49 and 50;
C.I. Vat Orange 1, 2, 9, 11, 13, 15, 19, 26, 29, 30, 30 and 31;
C.I. Vat Red 2, 10, 12, 13, 14, 16, 19, 21, 31, 32, 37, 41, 51, 52 and 61;
C.I. Vat Violet 2, 9, 13, 14, 15, 17 and 21;
C.I. Vat Blue 1 (C.I. Pigment Blue 66), 3, 5, 10, 12, 13, 14, -continued 16, 17, 18, 19, 20, 22, 25, 26, 29, 30, 31, 35, 41, 42, 43, 64, 65, 66, 72 and 74;
C.I. Vat Green 1, 2, 3, 5, 7, 8, 9, 13, 14, 17, 26, 29, 30, 31, 32, 33, 40, 42, 43, 44 and 49;
C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84;
C.I. Vat Black 1, 2, 7, 8, 9, 13, 14, 16, 19, 20, 22, 25, 27, 28, 29, 30, 31, 32, 34, 36, 56, 57, 58, 63, 64 and 65;
inorganic pigment:

| | |
|---|---|
| white pigments: | titanium dioxide (C.I. Pigment White 6), zinc white, pigment grade zinc oxide; zinc sulfide, lithopones lead white; |
| black pigments: | black iron oxide (C.I. Pigment Black 11), iron manganese black, spinel black (C.I. Pigment Black 27); carbon black (C.I. Pigment Black 7); |
| color pigments: | chromium oxide, chromium oxide hydrate green; chrome green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt violet and manganese violet; red iron oxide (C.I. Pigment Red 101); cadmium sulfoselenide (C.I. Pigment Red 108); molybdate red (C.I. Pigment Red 104); ultramarine red; brown iron oxide, mixed brown, spinel and corundum phases (C.I. Pigment Brown 24, 29 and 31); chrome orange; yellow iron oxide (C.I. Pigment Yellow 42); nickel titanium yellow (C.I. Pigment Yellow 53; C.I. Pigment Yellow 157 and 164); chrome titanium yellow; cadmium sulfide and cadmium zinc sulfide (C.I. Pigment Yellow 37 and 35); chrome yellow (C.I. Pigment Yellow 34), zinc yellow, alkaline earth metal chromates; Naples yellow, bismuth vandate (C.I. Pigment Yellow 184); |
| interference pigments: | metallic effect pigments based on coated metal platelets; pearlescent pigments based on metal oxide coated mica platelets; liquid crystal pigments. |

Preferred pigments in this context are monoazo pigments (especially laked BONS pigments, naphthol AS pigments), disazo pigments (especially diaryl yellow pigments, bisacetoacetanilide pigments, disazopyrazolone pigments), quinophthalone pigments, phthalocyanine pigments, triarylcarbonium pigments (alkali blue pigments, dye salts with complex anions), and carbon black.

The pigment present should be very finely divided. It is preferred for 95%, with particular preference 99%, of the pigment particles to have a size $\leq 1$ μm. For certain embodiments of the method of the invention, especially the ink-jet process, it is advantageous for all pigment particles to have a size of not more than 1 μm, in particular not more than 0.8 μm, and with particular preference not more than 0.5 μm. Such finenesses are generally achieved by filtration through filters of appropriate pore size.

The pigment particles may have different shapes and accordingly influence the flow behavior of the pigment preparations. Nonisometric pigment particles generally lead to higher flow viscosities and frequently to an absence of Newtonian flow characteristics, whereas isometric pigment particles generally produce less viscous preparations for a given pigment concentration and usually exhibit Newtonian flow characteristics.

The pigment content of the coating compositions of the invention depends of course on the particular desired end use and on the desired depth of color. In general, however, it is in the range from 0.5 to 50% by weight and in particular in the range from 1 to 20% by weight, based on the total weight of the coating composition, or in the range from 5 to 80% by weight, and in particular in the range from 10 to 70% by weight, based on the total amount of pigment and binder (polymer A and any cobinder(s)).

Depending on the application, the coating composition is formulated in an appropriate flowable form. Appropriate flowable forms include highly mobile solutions, fine dispersions, or viscous pastes in which the binder is present in dispersion or, preferably, in solution. Accordingly, the flowable coating compositions generally comprise at least one organic or aqueous solvent and/or diluent.

The application of the flowable coating compositions in step a. of the method of the invention is performed in the manner which is customary for the respective coating method. Preferred embodiments of the coating method of the invention are printing processes. Examples of printing processes are flexographic, offset, screen, and gravure printing and also the ink-jet process. A particularly preferred embodiment of the method of the invention is the ink-jet process.

In the ink-jet process, pigmented liquids of usually low viscosity (referred to below as inks) are sprayed as small droplets directly onto the substrate. A distinction is made between a continuous process, in which the ink is pressed at a uniform rate through a nozzle and the jet is directed onto the substrate by an electric field depending on the pattern to be printed, and an interrupted or drop-on-demand process, in which the ink is expelled only where a colored dot is to appear. The latter process employs either a piezoelectric crystal or a heated hollow needle (bubble jet or thermal jet process) to exert pressure on the ink system and so eject an ink droplet. Such procedures are described in Text. Chem. Color, 19 (1987), No. 8, 23–29, and 21 (1989), No. 6, 27–32.

The coating compositions may of course be applied to the target substrate in other ways, by knife coating, roller coating, brushing, dipping, or spraying, for example. Furthermore, the flowable coating compositions may be applied to the target substrate in the form of a writing ink. Techniques of this kind are known to the skilled worker.

Curing of the still wet coating obtained in step a. takes place in step b., in accordance with the invention, by exposure to high energy radiation. Step b. may be conducted under atmospheric or subatmospheric pressure or under an inert gas atmosphere. High energy radiation comprises not only electron beams but also UV light, preferably with a wavelength $\lambda \leq 450$ nm, especially $\leq 400$ nm and with particular preference $\leq 350$ nm, e.g., from 220 to 350 nm. An alternative is to use light sources having a visible light component, provided the principal component of the radiation has wavelengths $\lambda \leq 450$ nm and especially $\leq 400$ nm.

The UV radiation employed with preference may be used either in the form of continuous radiation, for example, through the coated surface with a UV lamp, or in the form of pulsed radiation. The output in the case of continuous radiation, achieved for example by using high pressure mercury vapor emitters, is generally situated at a lamp output of at least 80 W/cm, preferably at least 100 and, in particular, in the range from 120 to 240 W/cm. In the case of pulsed radiation, achieved for example by using flash lamps, even lower outputs are generally sufficient.

In the method of the invention it has proven particularly advantageous for step b. to comprise not only exposure to high energy radiation but also IR radiation, i.e., radiation comprising a high fraction in the wavelength range>800 nm.

Suitable IR sources include not only additional IR emitters but also those of the abovementioned UV lamps and flash lamps which produce an infrared radiation component in addition to the high energy radiation component.

Suitable substrate materials for the coating method of the invention, especially the printing method of the invention, include the following examples:

- coated or uncoated cellulosics such as paper, paperboard, cardboard, wood and woodbase materials,
- coated or uncoated metallic materials such as foils, sheets or workpieces composed of aluminum, iron, copper, silver, gold, zinc, or alloys of these metals,
- coated or uncoated silicatic materials such as glass, porcelain and ceramics,
- polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones, and corresponding copolymers and block copolymers, biodegradable polymers, and natural polymers such as gelatin,
- textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric,
- leather—both natural and artificial—in the form of smooth leather, nappa leather or suede leather, and
- comestibles.

The method of the invention has proven particularly suitable for coating nonswellable substrates.

The method of the invention is particularly advantageous for the coating, especially printing, of plastics surfaces, especially plastics containing ether or ester groups, examples being polyesters, polyoxymethylene, and also coated surfaces, e.g., surfaces with a nitrocellulose, melamine, alkyd or polyester varnish coating.

The method of the invention has proven particularly suitable for producing very thin coatings, as obtained for example when printing substrates. Such coatings generally have a film thickness after drying and UV curing (dry film thickness) of on average not more than 10 $\mu$m, in particular not more than 5 $\mu$m, and in particular in the range from 0.5 to 5 $\mu$m.

The coating compositions used in the method of the invention which comprise a photoinitiator are novel and are likewise provided by the present invention.

The present invention further provides flowable coating compositions comprising i) at least one binder comprising from 10 to 100% by weight, e.g., from 10 to 90% by weight, in particular from 20 to 80% by weight, of at least one polymer A, from 0 to 90% by weight, e.g., from 10 to 90% by weight, preferably from 20 to 80% by weight, of a cobinder selected from ethylenically unsaturated (pre) polymers having a double bond content of at least 2 mol/kg of (pre)polymer and mono- or polyethylenically unsaturated monomers, ii) at least one photoinitiator, iii) if desired, one or more organic or inorganic pigments, iv) customary auxiliaries and/or diluents and/or solvents.

Preferred embodiments of the coating compositions of the invention are pigmented coating compositions, especially in the form of an ink, in particular for writing inks or for the ink-jet process. General formulations for inks are known from the prior art, the inks of the invention comprising in place of the customary binders a binder of the invention comprising at least one polymer A and, if desired, an ethylenically unsaturated cobinder, as defined above.

Inks of the invention, especially those for the ink-jet process, comprise in addition to the binder i) and the photoinitiator ii) at least one organic or inorganic pigment iii) and also at least one organic solvent and/or water and customary auxiliaries.

Typical formulations for inks for the method of the invention, especially for the ink-jet process, generally comprise i) from 0.5 to 20% by weight, in particular from 1 to 10% by weight, of binders as defined above, ii) if desired, one or more photoinitiators in the amounts specified above, iii) from 0.1 to 20% by weight, in particular from 0.5 to 10% by weight, of pigment, iv) from 0 to 10% by weight of auxiliaries as common especially for ink-jet inks and in the printing or coatings industry (see also The Printing Ink Manual, 4th Edition, Van Nostrand Reinhold (International) London (1989)) and also solvents or diluents to a total of 100% by weight.

Of course, the low-viscosity flowable preparations for the method of the invention may also be formulated as pigment-free; i.e., as "colorless ink". In that case they comprise the remaining constituents i), if desired ii), and iv) in the stated amounts.

Preferably, the inks contain at least 80% by weight of at least one solvent or diluent. Suitable solvents are:

| | |
|---|---|
| monoalkanols: | especially $C_1$—$C_6$-alcohols such as methanol, ethanol, n-propanol, isopropanol, n-butanol, isobutanol, and cycloalkanols, e.g., cyclohexanol; |
| glycols: | preferably 2 to 4 carbon atoms, such as 1,2-ehthanediol, 1,2- and 1,3-propanediol, and 1,4-butanediol; |
| ester alcohols: | monoesters of the abovementioned glycols with carboxylic acids, preferably $C_1$—$C_4$-alkanecarboxylic acids, especially the acetates; |
| ether alcohols: | $C_1$—$C_6$-alkyl ethers of the abovementioned glycols such as methyl- and ethylethylene glycol, methyl- and ethylpropylene glycol; |
| esters: | esters of aliphatic carboxylic acids or hydroxycarboxylic acid with the abovementioned monoalkanols, especially the $C_1$—$C_6$-alkyl acetates and the $C_1$—$C_4$-alkyl lactates, and also lactones such as $\gamma$-butyrolactone; |
| amides: | amides and alkylamides of aliphatic carboxylic acids, especially formamides and acetamides such as dimethylformamide, and also lactums and N—$C_1$—$C_4$-alkyl lactums, e.g., pyrrolidone, N-methyl- and N-ethylpyrrolidone; |
| glycols; | | and mixtures of the abovementioned solvents with one another or with water. The water fraction in the solvent and/or diluent will preferably not exceed 80% by volume, in particular 50% by volume. In preferred embodiments, the solvent and/or diluent is substantially free from water, i.e., contains less than 10% by volume of water.

Preferred solvents are those which boil in the temperature range from 100 to 210° C. under atmospheric pressure.

Examples of such solvents are ethylene glycol monomethyl ether, glycerol, ethylene glycol monoacetate, N-methylpyrrolidone, cyclohexanone, cyclohexanol, ethyl lactate, methyl lactate, n-butyl lactate, and γ-butyrolactone.

In addition, the solvents may also include higher-boiling liquids such as 2-pyrrolidone and ethoxylates of glycerol, but preferably not more than 15% by weight, based on the total weight of the preparations.

Examples of auxiliaries are dispersants, e.g., the dispersants described in U.S. Pat. No. 4,218,218 and WO 99/01517, which are commonly used in an amount of from 0.1 to 20% by weight and, preferably, in an amount of from 0.5 to 10% by weight, based on the total weight of the ink. Further suitable auxiliaries are preservatives (e.g., glutaraldehyde and/or tetramethylolacetyleneurea), antioxidants, devolatilizers/defoamers, viscosity regulators, leveling assistants, wetting agents, antisettling agents, gloss enhancers, lubricants, adhesion promoters, antiskinning agents, flatting agents, stabilizers, hydrophobicizers, light stabilizer additives, handle improvers, and antistats. The total amount of said auxiliaries is generally less than 1% by weight, based on the total weight of the preparation.

The inks may of course also include fillers or waxes as auxiliaries in a minor amount.

Inks comprising water as diluent frequently include as auxiliary an agent having a water retention effect, especially if they are intended for use in the ink-jet process. Examples of water retention agents are polyhydric alcohols, preferably branched and unbranched $C_3$–$C_8$-alkanols, such as glycerol, erythritol, pentaerythritol, pentitols, such as arabitol, adonitol and xylitol, and hexitols, such as sorbitol, mannitol and dulcitol, particular preference being given to sorbitol. Further water retention agents are polyalkylene glycols having an average molecular weight in the range from 100 to 1500, particular preference being given to polyethylene glycols and, of these, to those having in particular an average molecular weight $\leq 800$. Mixtures of different water retention agents are of course also suitable, examples being combinations of polyalkylene glycols with polyhydric alcohols, and are also preferred. In general, inks contain from 0.1 to 35% by weight and, in particular, from 5 to 25% by weight of water retention agents, based on the total weight of the preparation.

The coating compositions of the invention are prepared by the processes customary for this purpose: in the case of the inks, for example, by dispersing the pigment—a presscake or a commercial binder/pigment mixture, for example,—in a solution of the polymer A and, if desired, of the cobinder and of the photoinitiator in an organic solvent and then filtering it.

The method of the invention, especially the printing methods, lead to coatings which adhere in particular to problematic substrates, i.e., nonswellable surfaces, such as plastics surfaces and coating materials. Moreover, the coatings obtained are stable with respect to the effect of solvents such as toluene, ethanol, acetone, esters such as ethyl acetate, halogenated hydrocarbons, e.g., chloroalkanes and chlorobenzenes.

The coating compositions of the invention are notable for improved stability over conventional radiation-curable coating compositions.

The coating compositions of the invention in ink form may be printed without problems.

The examples which follow are intended to illustrate the method of the invention without, however, restricting it.

Ink 1 (photoinitiator-free ink)

30 g of polyvinyl butyral/carbon black chips (carbon black content 50%, BASF Drucksysteme GmbH, Germany) were dispersed in 470 g of propylene glycol monomethyl ether and filtered through a 1 μm filter from Pall Gelmann Sciences (glass fiber filter extra thick, DIN 60078).

Ink 2 (photoinitiator-containing ink)

60 g of polyvinyl butyral/carbon black chips (carbon black content 50%) were dispersed in 800 g of propylene glycol monomethyl ether and 140 g of initiator solution and then centrifuged (Universal 16 centrifuge from Hettich) at 2500 rpm for 20 minutes.

The composition of the initiator solution used was as follows:

0.56 g of 2,4,6-trimethylbenzoyldiphenylphosphine oxide 0.56 g of benzophenone/hydroxycyclohexyl phenyl ketone mixture (Irgacure 500 from Ciba-Spezialitaten-Chemie, Basle) 0.56 g of methyldiethanolamine and 138.32 g of propylene glycol monomethyl ether Ink 3 (ink containing ethylenically unsaturated cobinder)

60 g of polyvinyl butyral/carbon black chips (50% carbon black) were suspended in a mixture of 800 g of propylene glycol monomethyl ether and 140 g of a solution of 67.3 g of an aromatic epoxy acrylate (Laromer® 8777 from BASF Aktiengesellschaft), 1 g 45 of 2,4,6-trimethylbenzoyldiphenylphosphine oxide, 1.6 g of Irgacure 500 and 2.7 g of methyldiethanolamine in 67.3 g of propylene glyol monomethyl ether and the suspension was then filtered through a 1 μm filter.

Performance tests

A. Print on Polyoxymethylene Surfaces

Using a standard commercial ink-jet printing head from XAAR, a test image was printed with inks 1 to 3 on a polyoxymethylene surface (cassettes, Tissue Tek III from Sakura, Japan). All inks were printable without problems.

Subsequently, the printed image was exposed to a UV flash (4000 J, 1/300 second, distance approximately 4 cm).

The prints thus obtained withstood an ethanol/toluene bath mixture for 24 hours without changes. Even after this treatment, the printed images could be wiped off neither with an ethanol-soaked cloth nor with an acetone- or toluene-soaked cloth. Unexposed prints dried by IR radiation did not withstand the solvent bath and smeared when subjected to a cloth soaked with one of the above-described solvents.

B. Prints on a Coating Film

For this purpose, inks 1 to 3 were printed in the manner described above onto the standardized coating film of a slide (from Menzel, ISO Standard 8037) and some of the printed slides were exposed as described above. The coated samples were stable to solvents, the tests being conducted in the manner described under A. The unexposed samples smeared when subjected to a solvent-soaked cloth. To this extent, the results found were the same as those for printing onto a polyoxymethylene layer.

C. Suitability as Writing Ink

Inks 1 to 3 were filled into empty fibertip pens. These pens were used to inscribe the surfaces specified under A and B and the surface was exposed in the manner described there. Testing was carried out in the manner described in A. Here again, a solvent-resistant inscription was obtained, whereas unexposed samples immediately smeared.

We claim:

1. A method of coating including the following steps:
   a. applying a flowable coating composition to the target substrate by an ink-jet process; and
   b. curing the resulting wet coating by exposure to U.V. radiation,
   wherein said coating composition is free of any photoinitiators and comprises as binder a polymer A containing less than 1 mol/(kg of polymer A) of reactive groups, selected from ethylenically unsaturated double bonds and epoxy groups, and at least 2 mol/(kg of polymer A) of functional groups of the formula

(I)

where
Y is N—H or oxygen, which are embodied in the substructures of the formulae IA, IB and/or IC

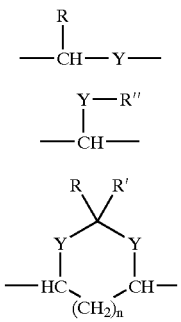

(IA)
(IB)
(IC)

where
R and R' independently of one another are hydrogen or $C_1$–$C_4$-alkyl
R" is $C_1$–$C_{20}$-alkyl,
Y is as defined above, and
n is 0 or 1,
the structural units of the formula IA, IB or IC being constituents of the polymer chain.

2. A method as claimed in claim 1, wherein said polymer A is selected from poly-$C_1$–$C_{20}$-alkyl vinyl ethers, polyoxymethylene, poly-$C_2$–$C_4$-alkylene oxides, polyether esters, polyether amides, polyether urethanes, acetalized polyvinyl alcohols and ketalized polyvinyl alcohols.

3. A method as claimed in claim 2, wherein said polymer A is polyvinyl butyral.

4. A method as claimed in claim 1, wherein said polymer A has a weight average molecular weight of at least 1000 g/mol.

5. A method as claimed in any of the preceding claims, wherein said coating composition contains from 10 to 90% by weight, based on the binder constituent in the coating composition, of at least one further, ethylenically unsaturated cobinder selected from ethylenically unsaturated prepolymers having a double bond content of at least 2 mol/kg of (pre)polymer, mono- or polyethylenically unsaturated monomers, and mixtures thereof.

6. A method as claimed in claims 1 to 4, wherein said coating composition does not contain an ethylenically unsaturated cobinder.

7. A method as claimed in claims 1 to 4, wherein the coating composition contains more than 80% by weight of solvents.

8. A method as claimed in claims 1 to 4, wherein said coating composition is applied in an amount such as to give a dry film thickness <10 µm.

9. A method as claimed in claims 1 to 4, wherein additionally in step b. the wet coating is exposed to IR radiation.

10. The method of claim 1, wherein said UV radiation is in the form of pulsed radiation.

11. The method of claim 1, wherein said U.V. radiation has a lamp output of at least 80 W/cm.

12. The method of claim 1, wherein said U.V. radiation has a wavelength $\lambda \leq 450$ nm.

13. The method of claim 1, wherein said U.V. radiation is a mercury vapor emitter.

* * * * *